(12) United States Patent
Mundheim

(10) Patent No.: US 9,409,801 B2
(45) Date of Patent: Aug. 9, 2016

(54) ALGINATE IMPROVEMENT

(75) Inventor: Atle Mundheim, Omastrand (NO)

(73) Assignee: SORBWATER TECHNOLOGY AS, Bergen (NO)

( * ) Notice: Subject to any disclaimer, the term of this patent is extended or adjusted under 35 U.S.C. 154(b) by 490 days.

(21) Appl. No.: 13/063,416

(22) PCT Filed: Jan. 19, 2011

(86) PCT No.: PCT/NO2011/000023
§ 371 (c)(1),
(2), (4) Date: Mar. 10, 2011

(87) PCT Pub. No.: WO2011/090391
PCT Pub. Date: Jul. 28, 2011

(65) Prior Publication Data
US 2011/0284471 A1    Nov. 24, 2011

(30) Foreign Application Priority Data

Jan. 19, 2010  (NO) .................................. 20100088

(51) Int. Cl.
| | | |
|---|---|---|
| B01D 21/01 | (2006.01) | |
| C02F 1/52 | (2006.01) | |
| C02F 1/68 | (2006.01) | |
| C02F 1/54 | (2006.01) | |
| C02F 1/66 | (2006.01) | |
| B03D 3/00 | (2006.01) | |
| C02F 1/00 | (2006.01) | |

(52) U.S. Cl.
CPC ................. *C02F 1/5272* (2013.01); *C02F 1/54* (2013.01); *C02F 1/66* (2013.01); *C02F 2209/06* (2013.01)

(58) Field of Classification Search
None
See application file for complete search history.

(56) References Cited

U.S. PATENT DOCUMENTS

| | | | |
|---|---|---|---|
| 3,951,797 A | 4/1976 | Seely | |
| 5,520,819 A | 5/1996 | Asahi et al. | |
| 6,267,893 B1* | 7/2001 | Luxemburg | .................... 210/723 |
| 6,372,145 B1 | 4/2002 | Tarbet | |
| 7,727,404 B2 | 6/2010 | Ylikangas et al. | |
| 2003/0089668 A1* | 5/2003 | Moffett | ................. C02F 1/5236 |
| | | | 210/725 |
| 2005/0098499 A1* | 5/2005 | Hussain | ........................ 210/639 |
| 2006/0163164 A1* | 7/2006 | Pratt | ............................. 210/724 |

(Continued)

FOREIGN PATENT DOCUMENTS

| | | | |
|---|---|---|---|
| CN | 1410372 A | 4/2003 | |
| JP | 10076274 | 3/1998 | |
| WO | WO 2009052362 A2 * | 4/2009 | ............... C08L 3/02 |

OTHER PUBLICATIONS

Nicholas M. Velings et al, Physico-Chemical Properties of Alginate Gel Beads, (1995) 311-330.

(Continued)

*Primary Examiner* — Nam Nguyen
*Assistant Examiner* — Clare Perrin
(74) *Attorney, Agent, or Firm* — Flener IP Law; Zareefa B. Flener

(57) ABSTRACT

A method is described use of hydrocolloids for removal of organic and inorganic pollutants from a continuous stream of liquid where chemical composition of the water inhibits the reactants for linking/cross linking hydrocolloids. The method is comprising the steps of enabling said reactants present in the liquid stream and bring them to reaction with the hydrocolloid already brought to attachment with pollutants, where after flock formation allows for separation. Applications of the method are also described.

12 Claims, 1 Drawing Sheet

Typical pH peak (pH vs buffering time in seconds)

(56) References Cited

U.S. PATENT DOCUMENTS

| | | |
|---|---|---|
| 2006/0163177 A1* | 7/2006 | Johnson et al. .............. 210/799 |
| 2007/0205157 A1 | 9/2007 | Jones et al. |
| 2007/0235391 A1* | 10/2007 | Ylikangas et al. ............ 210/702 |
| 2008/0190860 A1* | 8/2008 | Franks et al. ................. 210/724 |
| 2011/0210075 A1* | 9/2011 | Enos et al. ................... 210/702 |
| 2013/0193077 A1* | 8/2013 | Chidambaran et al. ....... 210/712 |

OTHER PUBLICATIONS

First Chinese Office Action dated Jul. 15, 2013 Appln. No. 201180011441.6.

* cited by examiner

Typical pH peak (pH vs buffering time in seconds)
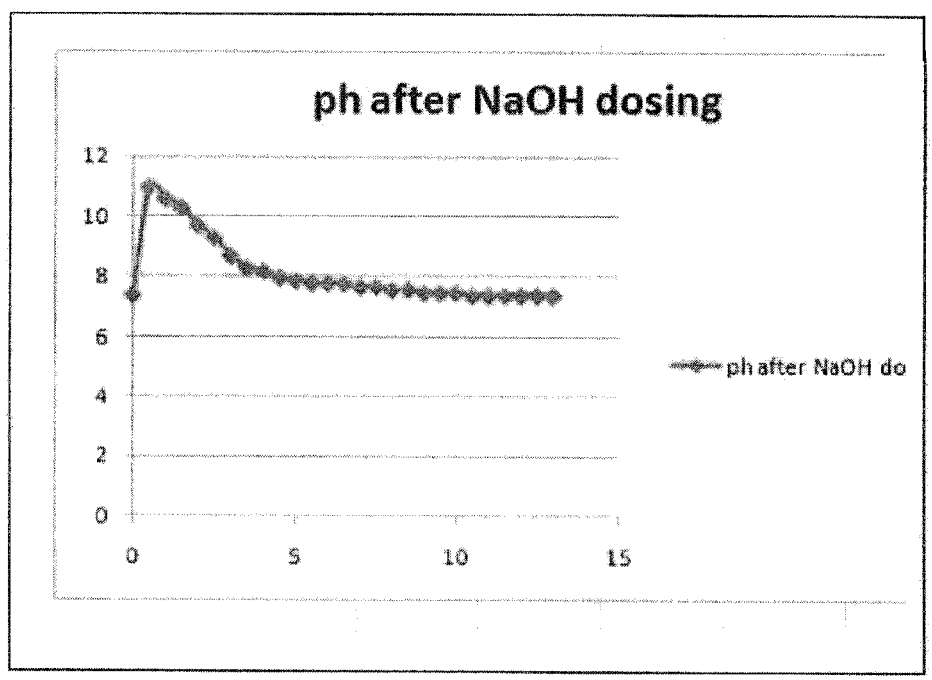

ALGINATE IMPROVEMENT

The present invention relates to a method for removal of organic and inorganic pollutants from a continuous flowing stream of liquid by mixing-in hydrocolloids capable of cross link with mono-, di-, or multi valence cationic ions, where such ions present in the water have their linking/cross linking capabilities disabled due to the chemical composition in the water, or subsequently such capabilities would be disabled if extra ions were added to the water, by according to the invention enabling these ions for a sufficient time to link/cross link the hydrocolloids already attached to the pollution, as it appears in the ingress of the subsequent claim 1.

In more detail, the invention relates to a method for bringing hydrocolloids in contact with pollution in a continuous liquid stream, followed by reacting the hydrocolloids with the pollution attached to link/cross link with dissociated cationic metal salts capable of link/cross link the hydrocolloids, so that large and strong flocks are formed for easily to be separated.

In specific, the invention relates to a method for activating the linking/cross linking cationic ions present or added to the water when they are disabled from linking/cross linking due to whole or partly occupancy to other chemicals or anions present in the water.

Furthermore, the invention relates to a mixing sequence method of NaOH and/or KOH and/or $Ca(OH)_2$ and hydrocolloids and/or mono-, di- or multi valence cationic metal salts capable of linking/cross linking the hydrocolloids, and subsequent removal of the flocculate.

Furthermore the invention relates to a sequence for mixing of hydrocolloids combined with a pressure drop to enable the disabled cationic linking/cross linking cations present in the water.

The invention also relates to applications of the method for given processes.

The invention is related to the technology of removal of organic and inorganic pollutants in a continuous liquid stream containing un-dissociated mono-, di- or multivalent cations, by the addition of one of, or a mixture of, hydrocolloids capable of cross link with dissociated cationic ions. The preferred hydrocolloids are alginate, carrageenan, carboxymethyl cellulose (CMC) or pectin which reacts by encapsulating the individual particle, then link/cross link with the previously un-dissociated cationic ions that according to the invention has been brought to reactive dissociated state. If there is not a sufficient amount of linking/cross linking ions present in the liquid, the reaction can be initiated by adding linking/cross linking ions to the water stream to achieve gel formation containing the pollutant before a separation.

Known Methods that are Used Today

It is known that alginate and carrageenan, extracted from brown algae and red algae, respectively, and pectin extracted from fruit are water-soluble biopolymers, and form hydrocolloid solutions in water. The viscosity forming characteristics of these hydrocolloids are determined by the size of the molecules. Alginate contains alternating mannuronate blocks, guluronate blocks (MG-blocks), mannuronate blocks (M-blocks) and guluronate blocks (G-blocks), and the gel-forming characteristics of alginate are decided by the content of guluronate blocks, and also their length. Alginate's ability to form gels arises from divalent cations (for example $C^{++}$) or other multivalent ions fitting into the G-block structure and thus binding the alginate polymers together and forming a continuous network. Application of this mechanism has hitherto been in film-formation, gel-formation in food material, medicines, textiles, colour and paper products in the main.

Within effluent water cleaning for removal of particulate matter, attempts have been made to use alginate according to the same principle (only encapsulation) as with the use of electrolytes, on its own or as a flocculation aid with the use of other flocculating agents, then as a help coagulant.

It is known from JP 10076274, among others to use inorganic coagulants, such as $Fe^{3+}$ with the subsequent addition of water-soluble, large molecule size, carboxylic salts for the encapsulation of coagulated material, and then to add multivalent ions to strengthen the coagulated material.

It is further known from KR 9609380 that a solution of 0.5-1% alginate in water at pH 1-4, after mixing in water containing heavy metals at a temperature of 20-40 degrees Celsius, can filter off the heavy metals after 20 to 40 minutes.

It is further known from U.S. Pat. No. 5,520,819 that, by adding and thereafter dissolving alginate and a retardant in a slurry of effluent water (dewatering of sludge) where in the main the alginate powder is mixed with carbonates or phosphates or citrates as retardants mixed into a slurry, where multivalent ions are a part of the slurry, so that one does not get a premature gelling with the metal ions and incomplete agglomeration and coagulation with solid matter in the slurry. The method describes addition of multivalent ions to make the material of liquid, particles, retardants and neutralised multivalent ions react. Examples show here that large amounts of powder are added and the treatment time is several hours. Water and particulate matter comes apart and can be separated. Examples show that the water must be treated afterwards with inorganic coagulants.

It is also known from inventors prior art described in U.S. Pat. No. 326,276, and patent applications NO20071122, and PCT/NO07/00121 and US20070235391 that cross linking hydrocolloids can be brought to use in water treatment by homogenous shear mixing in a continuous flow. Inventors prior art discloses further more that by diluting the hydrocolloid sufficiently in fresh water prior to said mixing premature gelling can be avoided when used for cross linking flock formation of pollution in waters containing high amounts of cross linking cations like $Ca^{2+}$, $Ba^{2+}$ and the like.

It is also known that hydrocolloids, in spite of high amounts of linking/cross linking cations in the water (Ref Table 1), do not cross link when applied in most produced waters from the oil and gas industry.

It is also known that hydrocolloids, in spite of high amounts of linking/cross linking cations in sea water (Ref Table 3), do not link/cross link when applied in sea water.

BRIEF DESCRIPTION OF THE DRAWINGS

FIG. 1 shows a typical pH peak effectuated by a pH-increasing reactant.

DETAILED DESCRIPTION OF THE INVENTION

Several attempts to cross link hydrocolloids mixed into produced water and slop water from oil and gas industry and also sea water failed. These attempts were performed according to inventors prior art by using diluted solutions of hydrocolloid followed by addition of cross linking cations to the water. Inhibiting chemical properties of the polluted water at the cross linking cations was the reason for failure.

Then it surprisingly was discovered that one by using the method according to the present invention managed to achieve cross linking every time regardless of chemical composition or inhibitors or scavengers present in the water.

Further investigation showed that by performing mixing of hydrocolloids into the continuous stream simultaneously or within the time window of a pH peak as illustrated in FIG. 1, cross linking took place every time. If the mixing of hydrocolloid took place after the peak when buffer reaction was completed, cross linking never occurred.

We do not know the exact mechanism, and without being bound by theory, this might by explained as follows;
One of the valences of $Ca^{2+}$ might have been occupied by one of or a combination of HCO3-, HSO3-, HSO4, or other anions available to engage OH groups, and no cross linking could take place.

When ph was increased the following reaction might occur:

A.) Ph increase

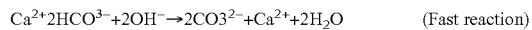

(Fast reaction)

B.) Precipitation

Slow reaction

The first reactions is immediate, the second takes roughly 10-15 seconds to complete. The second reaction leads to a decrease in pH.

The difference in reaction kinetic described above is according to the invention utilized by performing the hydrocolloid mixing and cross linking process in the few seconds time window prior to, during or after pH increase when sufficient $Ca^{2+}$ amounts according to equation A.) is available for cross linking. When buffering according to equation B.) is finished cross linking is impossible again (Ref FIG. 1).

The same release of divalent cations might take place in water with high CO2 and Ca(HCO3)2 when sudden pressure drop occurs as the HCO3 equilibrium then is driven to the left and the divalent cations becomes available for cross linking.

It is an aim of the invention to provide a new and improved method and process for the removal of organic and inorganic pollutants from a continuous stream of liquid, by blending-in hydrocolloids dissolved in fresh water or as solid powder in a slurry where the slurry liquid do not dissolve the hydrocolloid, and where cross linking cations are present or added in the liquid stream, but where the chemical properties of the liquid in the stream disables or has disabled the cross linking properties of the cations.

It is a further aim of the invention to provide a new and improved process for the above by dosing-in pH increasing reactant, just prior to, simultaneously or just after hydrocolloid addition, preferably NaOH, KOH or Ca(OH)2, or a mixture there off, where upon existing disabled cross linking cations present in the continuous liquid stream becomes enabled for cross linking prior to that buffering substantially reduces dissociated cross linking cations, where after mechanical separation of large agglomerates of gelled hydrocolloids and pollutant is possible.

It is a further aim of the invention to provide a new and improved process for instant serial mixing provided by static mixers or centrifugal pumps placed in the continuous liquid stream.

It is also an aim of the invention to provide a new and improved process for the above described process by replacing the pH enabling of cross linking disabled cations in the continuous liquid stream with a sudden pressure drop just prior to, simultaneously, or just after adding the hydrocolloid.

The methods and applications of the invention are characterised by the features that appear in the characteristic in the subsequent independent claims.

Further features of the invention are given in the dependent claims.

According to the present invention, a new and improved process is thereby provided for removal of organic and inorganic pollutants from a continuous stream of liquid by blending-in hydrocolloids dissolved in fresh water or as solid powder in a slurry where the slurry liquid do not dissolve the hydrocolloid, and where cross linking cations are present or added in the liquid stream, but where the chemical properties of the liquid in the stream disables or has disabled the cross linking properties of the cations.

Furthermore, a new and improved process for the above by dosing-in pH increasing reactant, just prior to, simultaneously or just after hydrocolloid addition, preferably NaOH, KOH or Ca(OH)2, or a mixture there off, where upon existing disabled cross linking cations present in the continuous liquid stream becomes enabled for cross linking prior to that buffering substantially reduces dissociated cross linking cations, where after mechanical separation of large agglomerates of gelled hydrocolloids and pollutant is possible.

It is further provided a new and improved method and process for instant serial mixing provided by static mixers or centrifugal pumps placed in the continuous liquid stream.

It is also provided a new and improved process for the above described process by replacing the pH enabling of cross linking disabled cations in the continuous liquid stream with a sudden pressure drop just prior to, simultaneously, or just after adding the hydrocolloid.

The present invention thus relates to a method for removal of organic and/or inorganic pollutants from a continuous liquid stream, wherein cations capable of linking/cross linking hydrocolloids are occupied with at least one of their valences by one or more of HCO3-, HSO3-, HSO4, or other anions available to engage OH groups, where said linking/cross linking cations are liberated from their occupancy to $HCO3^-$, $HSO3^-$, HSO4, or other anions available to engage OH groups to become 100% dissociated along with their respective anions by means of a introduced pH peak or a introduced pressure drop, and in which pH peak or pressure drop a hydrocolloid added and brought in contact with the pollution in the liquid stream link/cross link with the dissociated cations prior to full buffering is obtained after a pH peak or prior to ionic balance is restored after a pressure drop.

Furthermore, the invention is characterised in that the hydrocolloid is reacted to crosslink in the few second window after pH increase before buffering has taken place in the continuous liquid stream after the pH peak, or prior to ionic balance is restored in the few seconds after a pressure drop in the continuous liquid stream.

The invention is characterised in that the hydrocolloid is dosed and mixed into the continuous liquid stream just prior to, during, or just after introduction of the pH peak or pressure drop.

The invention is further characterised in that the hydrocolloid is solved in fresh water prior to dosing and mixing it into the continuous liquid stream, or that is dosed and mixed into the continuous liquid stream suspended as powder in a slurry in a fluid that do not solve the hydrocolloid.

Furthermore, the invention is characterised in that the pH peak is obtained by dosing and mixing in one of NaOH, KOH, Ca(OH)2 or a mixture thereof.

Furthermore, the invention is characterised in that in absence of cross linking ions, such ions can be added before, during or just after the pH peak is introduced, however available for linking/cross linking in the few seconds time window before pH buffering is completed, or before ionic balance is restored after a pressure drop.

Furthermore, the invention is characterised in that a mixing train for pH peak additives, hydrocolloid additives, and optional extra linking/cross linking cation additives is arranged in a pipeline transporting the continuous liquid flow.

Furthermore, the invention is characterised in that the said mixing train is arranged to mix and react all the said additives within the few second time window that cations have all their valences free due to the pH peak.

Furthermore, the invention is characterised in that the a valve provide a pressure drop and a mixing train is arranged to mix and react the hydrocolloid and optionally added linking/cross linking cations within a few second time window.

With flocculation we mean the process where dispersed drops or particles aggregate to larger particles or aggregates or agglomerates. This includes coagulation of dissolved macromolecules to particles.

With diluted solution we mean a solution where the hydrocolloid is present in a concentration, preferably below the critical overlap concentration, where critical overlap concentration is that concentration where there is no formation of a continuous network of polysaccharide molecules.

A preferred hydrocolloid is alginate. A preferred alginate has a content of G-blocks that is high enough to form sufficiently strong flocs to be separated from the polluted liquid stream by said methods. The alginate should have a G-content above 30%, preferably above 40%, and most preferably above 50%.

Another hydrocolloid is carrageenan. The carrageenan can be of the type kappa, iota, lambda, kappa-2 or other variants. The carrageenan should preferably be of the type that is cross-linked by multivalent ions, such as lambda carrageenan Another hydrocolloid is pectin. Pectin can be of the high methoxylated or low methoxylated pectin types, preferably low methoxylated type that can be cross-linked with multivalent cations.

Another hydrocolloid is carboxymethyl cellulose (CMC).

Advantages of the Present New Method

The present method has the advantage that hydrocolloids can be brought to link/cross link with cation inhibitors present in the water to be treated in an online flow and thereby make possible use of hydrocolloids in waters containing scale inhibitors, corrosion inhibitors, H2S scavengers and also in waters containing natural cross linking cation inhibitors such as HCO3-, HSO3-, HSO4, or other anions available to engage OH groups.

The reaction takes place in instantly, and mixing can be performed in milliseconds in each stage in an online flow, which allows for treatment of produced water flows of several thousand m3/h inline.

Introduction of just a pH peak is substantially cost saving as pH do not have to be permanently increased and buffer in the water do not have any significant impact.

Large flows of hydrocarbon containing produced waters can be flocculated by link/cross linking hydrocolloids, that would not respond to this method with known methods.

Mixing train of static mixers is space saving, and mixing train with pressure drop valve is space saving.

Reacted continuous liquid stream can be treated by conventional separation technologies such as flotation, hydro cyclones, compact flotation cyclones, decanters or sedimentation after treatment according to the invention.

Slop water with severe hourly variations of chemical composition varying from rain water with oil, mud, detergents and completion fluids can be treated with one and the same method.

Introducing just a pH peak or a pressure drop and the mixing process within the few seconds said time window, enables linking/cross linking cations to react with hydrocolloids which opens for treatment of water contaminated drilling mud, completion fluids and wastewaters from heavily chemical contaminated waters from all kind of well operations with one and same method.

Use of hydrocolloids to cross link and remove pollution from sea water is made possible.

The small amounts of NaOH or KOH or Ca(OH)2 used for to create a pH peak, preferably to 10.5 results in negligible carbonate precipitation.

The present invention distinguishes itself from existing processes where the principle for application of polyelectrolytes or other flocculating agents for removal of pollutants in a liquid stream is based on either charge neutralisation or encapsulation, in that one gets larger and stronger agglomerates of gel bound to pollutant faster by the mixing-in of hydrocolloid before complete binding of free G-blocks in the reaction with multivalent cations in excess. A fast flocculation is achieved by using the high affinity of the hydrocolloids for multivalent ions.

The present invention distinguishes itself from existing processes in that hydrocolloids can be brought to link/cross linking in a continuous liquid stream in a few seconds even if the linking/cross linking cations present in the stream or added to the stream are inhibited by the chemical composition of the water.

The present invention distinguishes itself from existing processes in that instant mixing can take place in milli seconds in a continuous stream, and reaction take place in seconds.

The present invention distinguishes itself from existing processes minimum use of additives beside hydrocolloid is required.

The present invention distinguishes itself from existing processes in that mixing and reaction takes place in a online high capacity process that works regardless of chemical composition of the waters described.

The present invention distinguishes itself from existing processes in that mixing can be done instantly.

With regard to the above, the invention distinguishes itself also from other processes in that the above described process steps are not known for oil/water separation in the production process of oil from an oil reservoir.

Furthermore, with regard to the above, the invention distinguishes itself from other processes also in that the above described process steps are not known in the cleaning of slop water from the oil and gas industry.

Furthermore, with regard to the above, the invention distinguishes itself from other processes also in that the above described process steps are not known in the cleaning of completion fluids from the oil and gas industry.

Furthermore, with regard to the above, the invention distinguishes itself from other processes also in that the above described process steps are not known in the cleaning of contaminated mud from the oil and gas industry.

Furthermore, with regard to the above, the invention distinguishes itself from other processes also in that the above described process steps are not known in the cleaning of sea water based waste water.

The method according to the invention shall be explained in more detail in the following description with reference to examples, in which:

Test 1.

One liter sea water was added a small portion white clay to achieve visual turbidity. 0.02% diluted Sodium Alginate was rapidly mixed in under shear. No flocks were observed in spite of natural Ca++ sufficient for flock formation was present in the sea water. 500 ppm of extra CaCl was then mixed in the water. Still no flocks were observed.

Test 2.

One liter sea water was added a small portion white clay to achieve visual turbidity. pH was initially 7.9. pH was raised in a peak to 10.3 and allowed to buffer back to 7.95 where upon 0.02% diluted Sodium Alginate was rapidly mixed in under shear. No flocks were observed.

Test 3

One liter sea water was added a small portion white clay to achieve visual turbidity. pH was initially 7.9. pH was raised in a peak to 10.3 where upon 0.02% diluted Sodium Alginate was rapidly mixed in under shear during the first seconds of the peak. Instant flock formation was observed.

Test 4

One liter sea water was added a small portion white clay to achieve visual turbidity. pH was initially 7.9. pH was raised in a peak to 10.3 where upon 0.02% diluted Sodium Alginate was rapidly mixed in under shear simultaneously with addition of the NaOH. Instant flock formation was observed.

Test 5

One liter sea water was added a small portion white clay to achieve visual turbidity. pH was initially 7.9. Sodium Alginate as in previous examples was mixed in under shear seconds before raising the pH in a peak to 10.3. Instant flock formation was observed.

Test 6

Produced water at an offshore field was processed through a treatment unit comprising dosing station for 0.02% water diluted Sodium Alginate. A ProPure M100 static inline mixer mixed the solution instantly with the produced water stream of 1.5 m3/h. Pressure was constant 5 bar. $Ca^{++}$ content was 800 ppm, and high content of $CO_2$ and $HCO_3$ was present in the water. Scale inhibitor was previously added to the water as well as corrosion inhibitors. No flock formation was observed in samples collected. A bottle of 1 l containing 5 ppm of the Sodium Alginate solution was shook under the sampling point as it was filled. Pressure drop from 5 bar to atmospheric pressure was obtained. Instant and strong flock formation was observed.

Test 7

The produced water test described in test 6 was rearranged to comprise an additional ProPure M100 inline mixer for NaOH and flanged directly in front of the mixer for Sodium Alginate. pH of the produced water was 6.9, and otherwise containing hydrocarbons and similar additives as in test 6. pH was peaked to 10.5 and dropped naturally after 13 seconds to 7.0. In less than 3 seconds from start of the pH peak Sodium Alginate was reacted in the second mixer. Instantly strong flocks were observed containing the hydrocarbons, which was easily separated in a compact flotation unit.

Test 4

Offshore Slop Water varying from day to day was full scale tested at a treatment facility onshore for 5 months on daily basis. Test rig comprised the steps pH peak initiated by NaOH mixed in the continuous flow by a centrifugal pump, where upon mixing in of 200 ppm Sodium Alginate were performed after 2 seconds, and then immediately, as security in case of pure rain water was treated, 1000 ppm extra CaCl2 was mixed in. All mixing was done in 3 centrifugal pumps in series. Time for mixing all ingredients from first pump to last was less than 8 seconds.

Solids was then separated in a Hiller 2 phase decanter, where after remaining oil was separated in flotation after one more time adding 5 ppm of Sodium Alginate in the liquid flow after the decanter and prior to flotation. Treated water varied from rain water containing small amounts of oil, mixtures of such and brines, mud, soap and detergents. The system treated as much as 40 oil based mud and 60% water, saturated brines of complex binding K-Formiate and Na-Formiate, and $Ca^{++}$ content from 1000 to 10000 ppm, all varying from day to day. Content of HCO3 was very high 95% of the time, and huge amounts of scale inhibitors was present in the water.

Tests showed that the water was not treatable unless using the method according to present invention.

The method according to invention was tested for 5 months at flow rates of 10 m3/h and flocculation did not fail once when peaking the pH to 10.5 followed by Sodium Alginate dosing and $CaCl_2$ dosing within 8 seconds after introducing the pH peak.

Further more it was discovered that when Sodium Alginate dosing was attempted before flotation after the decanter initially no flocculation was obtained. Time from initial pH peak was then 1 minute. Introducing a second ProPure M100 mixer and initializing a second pH peak followed by Sodium Alginate dosing within the few second window before the peak buffered resulted in excellent flocculation also prior to the flotation tank. This showed that dosing of Sodium Alginate after buffering was finished from the first pH peak did not work, but another introduced peak and dosing within the few second time frame in the peak gave good results.

pH in the end of the process was equal to initial pH of the water, and consumption of NaOH was negligible.

Test 5

10 m3 of contaminated spent oil based drilling mud, containing 60/40 ratio of water/oil had a dry solids content of 13% as fines. The mud was made to keep water/solids and oil in an stable emulsion.

First the mud was processed 3 $m^3/h$ through a 2 phase decanter with rpm 3900 for separation of the 2 phases solids and oil/water. Poor separation took place and almost no solids were removed.

Second the mud was processed 3 m3/h through a mixing skid comprising 2 centrifugal pumps with rpm of 3500 in which 200 ppm of carrageenan capable of link/crosslink with potassium and Ca2+ were dosed in the first, and 1000 ppm CaCl2 was dosed in. Retention time between the two mixing points were 4 seconds. The mud was directly processed in the decanter as described in first trial. Poor separation took place and almost no solids were removed.

Third the mud was processed 3 $m^3/h$ through a mixing skid comprising 3 centrifugal pumps with rpm of 3500 in which in the first a pH peak to 10.5 was obtained with NaOH, then 200 ppm of carrageenan capable of link/crosslink with potassium and Ca2+ were dosed in the second, and 1000 ppm CaCl2 was dosed in the third. Retention time between the three mixing points were 8 seconds. The mud was directly processed in the decanter as described in first and second trials. Excellent separation took place and almost all solids were removed. The water/oil phase was very easy separated in flotation without solids residual.

The test showed that potassium present in the mud and $Ca^{2+}$ added in the mud linked/cross linked the carrageenan.

At last same procedure as above was followed with exeption of addition of $Ca^{2+}$. Again excellent separation took place and almost all solids were removed. The water/oil phase was very easy separated in flotation without solids residual.

This last trial showed that inhibited potassium and $Ca^{2+}$ present in the mud was dissociated during the pH peak, and that the method according to the invention worked well.

TABLE 1

Produced water

| | Total [g/L] | Na [g/L] | Cl [g/L] | Ca [g/L] | K [g/L] | HCO3 [g/L] | Sr [g/L] | Ba [g/L] | Hg |
|---|---|---|---|---|---|---|---|---|---|
| Salt content in Statfjord water | 24.642 | 8.64 | 14.3 | 0.3 | 0.19 | 1.1 | 0.05 | 0.062 | |

TABLE 2

CO2 solubility vs pressure

| CO2 Pressure (Atm) | | ph | solubility, Ca++ mg/l |
|---|---|---|---|
| 1 × 10E−5 | 0.00001 | 9.83 | 4.8 |
| 1 × 10E−4 | 0.0001 | 8.62 | 16.4 |
| 3.5 × 10E−4 | 0.00035 | 8.27 | 18.8 |
| 1 × 10E−3 | 0.001 | 7.96 | 26.5 |
| 1 × 10E−2 | 0.01 | 7.3 | 56.8 |
| 1 × 10E−1 | 0.1 | 6.63 | 122 |
| 1 | 1 | 5.96 | 260 |
| 10 | 10 | 5.3 | 568 |

TABLE 3

Major Ion composition of seawater (mg/L)

| | Typical Seawater | Eastern Mediterranean | Arabian Gulf at Kuwait | Red Sea at Jeddah |
|---|---|---|---|---|
| Chloride (Cl$^-$) | 18.980 | 21.200 | 23.000 | 22.219 |
| Sodium (Na$^+$) | 10.556 | 11.800 | 15.850 | 14.255 |
| Sulfate (SO$_4^{2-}$) | 2.649 | 2.950 | 3.200 | 3.078 |
| Magnesium (Mg$^{2+}$) | 1.262 | 1.403 | 1.765 | 742 |
| Calcium (Ca$^{2+}$) | 400 | 423 | 500 | 225 |
| Potassium (K$^+$) | 380 | 463 | 460 | 210 |
| Bicarbonate (HCO$_3^-$) | 140 | — | 142 | 146 |
| Strontium (Sr$^{2+}$) | 13 | — | — | — |
| Bromide (Br$^-$) | 65 | 155 | 80 | 72 |
| Borate (BO$_3^{3-}$) | 26 | 72 | — | — |
| Fluoride (F$^-$) | 1 | — | — | — |
| Silicate (SiO$_3^{2-}$) | 1 | — | 1,5 | — |
| Iodide (I$^-$) | <1 | 2 | — | — |
| Others | — | — | — | — |
| Total dissolved solids (TDS) | 34.483 | 38.600 | 45.000 | 41.000 |

Note:
The dot (.) separates thousands
The comma (,) separates decimals

The invention claimed is:

1. Method for removal of organic and/or inorganic pollutants from a continuous liquid stream comprising the steps of:
   selecting a continuous liquid stream to be treated based upon a selection criteria, said selection criteria comprising ascertaining that the chemical composition of the continuous liquid stream prevents cations otherwise capable of linking/crosslinking hydrocolloids from so linking/crosslinking at an initial pH value,
   measuring the pH of the continuous liquid stream to be treated to determine the initial pH value;
   determining an amount of a pH-increasing reactant to add to the continuous liquid stream to effectuate a pH peak of above 10 in at least a portion of the continuous liquid stream, and within 15 seconds thereafter, a decrease to below pH 10 and a continued decrease in pH towards the initial pH value;
   adding the pH-increasing reactant in the determined amount at a location in the continuous liquid stream to effectuate a pH peak above 10 and a pH decrease thereafter within 15 seconds,
   adding a hydrocolloid to the continuous liquid stream just prior to, during, or within 15 seconds of effectuating the pH peak, whereby the hydrocolloid attaches with the organic and/or inorganic pollutants in the continuous liquid stream and links/cross links to form a flocculate, and
   removal of the flocculate.

2. Method according to claim 1, wherein selection criteria further comprises ascertaining that cations in the continuous liquid stream are prevented from linking/crosslinking at the initial pH due to having at least one of their valences occupied by anions, said anions selected from the group consisting of HCO3-, HSO3- and HSO4-.

3. Method according to claim 1, wherein the hydrocolloid is dissolved in water prior to dosing and mixing it into the continuous liquid stream, or that the hydrocolloid is dosed and mixed into the continuous liquid stream suspended as a powder in a slurry in a fluid that does not dissolve the hydrocolloid.

4. Method according to claim 1, wherein effectuating the pH peak comprises raising the pH to 10.5 by dosing and instantly mixing one of NaOH, KOH, Ca(OH)2 or a mixture thereof into the continuous liquid stream.

5. Method according to claim 1, wherein in the absence of linking/cross linking cations, such linking/cross linking cations can be added before, during or just after the pH peak is effectuated.

6. Method according to claim 1, wherein a mixing train for pH peak additives, hydrocolloid additives, and optional extra cross-linking cation additives is arranged in a pipe transporting a continuous liquid flow.

7. The method according to claim 1, wherein the flocculate is removed by a process selected from mechanical separation, flotation and sedimentation.

8. The method according to claim 1, wherein said continuous liquid stream to be treated comprises water produced by an oil or gas industry prior to discharging the water to a sea.

9. The method according to claim 1, wherein said continuous liquid stream to be treated comprises slop water from an oil industry or a gas industry prior to discharging the slop water to a sea.

10. The method according to claim 1, wherein continuous liquid stream to be treated comprises completion fluids from an oil industry or a gas industry.

11. The method according to claim 1, wherein said continuous liquid stream to be treated comprises spent drilling mud from an oil industry or a gas industry.

12. The method according to claim 1, wherein the hydrocolloid is added and mixed within 8 seconds of effectuating the pH peak.

* * * * *